United States Patent
Si et al.

(10) Patent No.: US 11,943,634 B2
(45) Date of Patent: **\*Mar. 26, 2024**

(54) METHOD AND APPARATUS FOR INDEXING OF SS/PBCH BLOCK IN UNLICENSED SPECTRUM

(71) Applicant: Samsung Electronics Co., Ltd., Suwon-si (KR)

(72) Inventors: Hongbo Si, Plano, TX (US); Yingzhe Li, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/165,185

(22) Filed: Feb. 6, 2023

(65) Prior Publication Data

US 2023/0189011 A1    Jun. 15, 2023

Related U.S. Application Data

(63) Continuation of application No. 17/075,509, filed on Oct. 20, 2020, now Pat. No. 11,576,051.

(Continued)

(51) Int. Cl.
*H04W 16/14* (2009.01)
*H04L 5/00* (2006.01)
(Continued)

(52) U.S. Cl.
CPC .......... *H04W 16/14* (2013.01); *H04L 5/0048* (2013.01); *H04W 52/146* (2013.01); *H04W 72/23* (2023.01)

(58) Field of Classification Search
CPC ... H04W 16/14; H04W 52/146; H04W 72/23; H04L 5/0048
See application file for complete search history.

(56) References Cited

U.S. PATENT DOCUMENTS

2019/0081753 A1    3/2019  Jung
2020/0150013 A1*   5/2020  He ........................ G01N 11/16
(Continued)

OTHER PUBLICATIONS

"3rd Generation Partnership Project; Technical Specification Group Radio Access Network; NR; Physical channels and modulation (Release 15)", 3GPP TS 38.211 V15.4.0, Dec. 2018, 96 pages.
(Continued)

Primary Examiner — John D Blanton

(57) ABSTRACT

A method and apparatus of a user equipment (UE) in a wireless communication system is provided. The method and apparatus comprises: receiving a synchronization signals and physical broadcast channel (SS/PBCH) block; determining whether a shared spectrum channel access is enabled; determining a first index of the SS/PBCH block as a candidate SS/PBCH block index ($I_{SSB1}$) based on a number of candidate SS/PBCH blocks in a half frame; and determining a second index of the SS/PBCH block as an SS/PBCH block index ($I_{SSB2}$) based on a quasi-co-location (QCL) parameter (Q) indicated by a PBCH in the SS/PBCH block, wherein the SS/PBCH block index ($I_{SSB2}$) is determined as: $I_{SSB2}=I_{SSB1}$ mod Q based on a determination that the shared spectrum channel access is enabled, where mod is a modular operation; or $I_{SSB2}=I_{SSB1}$ based on the determination that the shared spectrum channel access is not enabled.

20 Claims, 10 Drawing Sheets

Related U.S. Application Data

(60) Provisional application No. 62/943,004, filed on Dec. 3, 2019, provisional application No. 62/942,481, filed on Dec. 2, 2019, provisional application No. 62/941,170, filed on Nov. 27, 2019, provisional application No. 62/932,955, filed on Nov. 8, 2019, provisional application No. 62/927,911, filed on Oct. 30, 2019.

(51) Int. Cl.
*H04W 52/14* (2009.01)
*H04W 72/23* (2023.01)

(56) References Cited

U.S. PATENT DOCUMENTS

| | | | | |
|---|---|---|---|---|
| 2020/0187302 | A1* | 6/2020 | Si | H04W 72/30 |
| 2021/0297966 | A1* | 9/2021 | Noh | H04W 56/006 |
| 2022/0264430 | A1* | 8/2022 | Kim | H04J 11/0073 |

OTHER PUBLICATIONS

"3rd Generation Partnership Project; Technical Specification Group Radio Access Network; NR; Multiplexing and channel coding (Release 15)", 3GPP TS 38.212 V15.4.0, Dec. 2018, 100 pages.
"3rd Generation Partnership Project; Technical Specification Group Radio Access Network; NR; Physical layer procedures for control (Release 15)", 3GPP TS 38.213 V15.4.0, Dec. 2018, 104 pages.
"3rd Generation Partnership Project; Technical Specification Group Radio Access Network; NR; Physical layer procedures for data (Release 15)", 3GPP TS 38.214 V15.4.0, Dec. 2018, 102 pages.
"3rd Generation Partnership Project; Technical Specification Group Radio Access Network; NR; Radio Resource Control (RRC) protocol specification (Release 15)", 3GPP TS 38.331 V15.4.0, Dec. 2018, 474 pages.
International Search Report of the International Searching Authority in connection with International Application No. PCT/KR2020/014945, dated Feb. 10, 2021, 3 pages.
NTT Docomo, Inc., "Enhancements to initial access procedure for NR-U", R1-1906198, 3GPP TSG RAN WG1 Meeting #97, Reno, USA, May 13-17, 2019, 11 pages.
Nokia, et al., "On Enhancements to Initial Access Procedures for NR-U", R1-1910614, 3GPP TSG RAN WG1 Meeting #98bis, Chongqing, P.R. China, Oct. 14-20, 2019, 19 pages.
OPPO, "Enhancements to initial access procedure for NR-U", R1-1910791, 3GPP TSG RAN WG1 Meeting #98bis, Chongqing, China, Oct. 14-20, 2019, 7 pages.
Qualcomm Incorporated, "Initial access and mobility procedures for NR unlicensed", R1-1911098, 3GPP TSG RAN WG1 Meeting #98bis, Chongqing, China, Oct. 14-20, 2019, 15 pages.
Extended European Search Report dated Jan. 4, 2022 regarding Application No. 20880691.9, 19 pages.
Potevio, "Enhancements to Initial Access Procedures for NR-U", 3GPP TSG RAN WG1 #98, R1-1909373, 6 pages.
Spreadtrum Communications, "Discussion on initial access and mobility in NR-U", 3GPP TSG RAN WG1 #98, R1-1908964, 10 pages.
"3rd Generation Partnership Project; Technical Specification Group Radio Access Network; NR; Physical channels and modulation (Release 15)", 3GPPTS 38.211 V15.7.0, Sep. 2019, 97 pages.
"3rd Generation Partnership Project; Technical Specification Group Radio Access Network; NR; Multiplexing and channel coding (Release 15)", 3GPPTS 38.212 V15.7.0, Sep. 2019, 101 pages.
"3rd Generation Partnership Project; Technical Specification Group Radio Access Network; NR; Physical layer procedures for control (Release 15)", 3GPP TS 38.213 V15.7.0, Sep. 2019, 108 pages.
European Patent Office, Communication pursuant to Article 94(3) EPC dated Aug. 22, 2023 regarding Application No. 20880691.9, 17 pages.
Intel Corporation, "Enhancements to initial access and mobility for NR-unlicensed", 3GPP TSG RAN WG1 Meeting #98bis, R1-1910641, Oct. 2019, 10 pages.

* cited by examiner

METHOD AND APPARATUS FOR INDEXING OF SS/PBCH BLOCK IN UNLICENSED SPECTRUM

CROSS-REFERENCE TO RELATED APPLICATIONS AND CLAIM OF PRIORITY

This application is a continuation of U.S. patent application Ser. No. 17/075,509, filed on Oct. 20, 2020, which claims priority to: U.S. Provisional Patent Application No. 62/927,911, filed on Oct. 30, 2019; U.S. Provisional Patent Application No. 62/932,955, filed on Nov. 8, 2019; U.S. Provisional Patent Application No. 62/941,170, filed on Nov. 27, 2019; U.S. Provisional Patent Application No. 62/942,481, filed on Dec. 2, 2019; and U.S. Provisional Patent Application No. 62/943,004, filed on Dec. 3, 2019. The contents of the above-identified patent documents are incorporated herein by reference.

TECHNICAL FIELD

The present disclosure relates generally to wireless communication systems and, more specifically, the present disclosure relates to indexing of synchronization signal/physical broadcast channel (SS/PBCH) block (SSB) on unlicensed spectrum.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

SUMMARY

The present disclosure relates to wireless communication systems and, more specifically, the present disclosure relates to indexing of SS/PBCH block on unlicensed spectrum.

In one embodiment, a user equipment (UE) in a wireless communication system is provided. The UE includes a transceiver configured to receive a SS/PBCH block. The UE further includes a processor operably connected to the transceiver, the processor configured to: determine whether a shared spectrum channel access is enabled, determine a first index of the SS/PBCH block as a candidate SS/PBCH block index ($I_{SSB1}$) based on a number of candidate SS/PBCH blocks in a half frame, and determine a second index of the SS/PBCH block as an SS/PBCH block index ($I_{SSB2}$) based on a quasi-co-location (QCL) parameter (Q) indicated by a PBCH in the SS/PBCH block, wherein the SS/PBCH block index ($I_{SSB2}$) is determined as: $I_{SSB2}=I_{SSB1}$ mod Q based on a determination that the shared spectrum channel access is enabled, where mod is a modular operation; or $I_{SSB2}=I_{SSB1}$ based on the determination that the shared spectrum channel access is not enabled.

In another embodiment, a base station (BS) in a wireless communication system is provided. The BS includes a processor configured to: indicate whether a shared spectrum channel access is enabled, indicate a first index of a SS/PBCH block that is determined as a candidate SS/PBCH block index ($I_{SSB1}$) based on a number of candidate SS/PBCH blocks in a half frame, and indicate a second index of the SS/PBCH block that is determined as an SS/PBCH block index ($I_{SSB2}$) based on a QCL parameter (Q). The Bs further includes a transceiver operably connected to the processor, the transceiver configured to transmit the SS/PBCH block, wherein the SS/PBCH block includes a PBCH indicating the QCL parameter (Q).

In yet another embodiment, a method of a UE in a wireless communication system is provided. The method comprises: receiving a SS/PBCH block; determining whether a shared spectrum channel access is enabled; determining a first index of the SS/PBCH block as a candidate SS/PBCH block index ($I_{SSB1}$) based on a number of candidate SS/PBCH blocks in a half frame; and determining a second index of the SS/PBCH block as an SS/PBCH block index ($I_{SSB2}$) based on a QCL parameter (Q) indicated by a PBCH in the SS/PBCH block, wherein the SS/PBCH block index ($I_{SSB2}$) is determined as: $I_{SSB2}=I_{SSB1}$ mod Q based on a determination that the shared spectrum channel access is enabled, where mod is a modular operation; or $I_{SSB2}=I_{SSB1}$ based on the determination that the shared spectrum channel access is not enabled.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code"

includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v15.4.0, "NR; Physical channels and modulation"; 3GPP TS 38.212 v15.4.0, "NR; Multiplexing and Channel coding"; 3GPP TS 38.213 v15.4.0, "NR; Physical Layer Procedures for Control"; 3GPP TS 38.214 v15.4.0, "NR; Physical Layer Procedures for Data"; and 3GPP TS 38.331 v15.4.0, "NR; Radio Resource Control (RRC) Protocol Specification."

Figure 1:
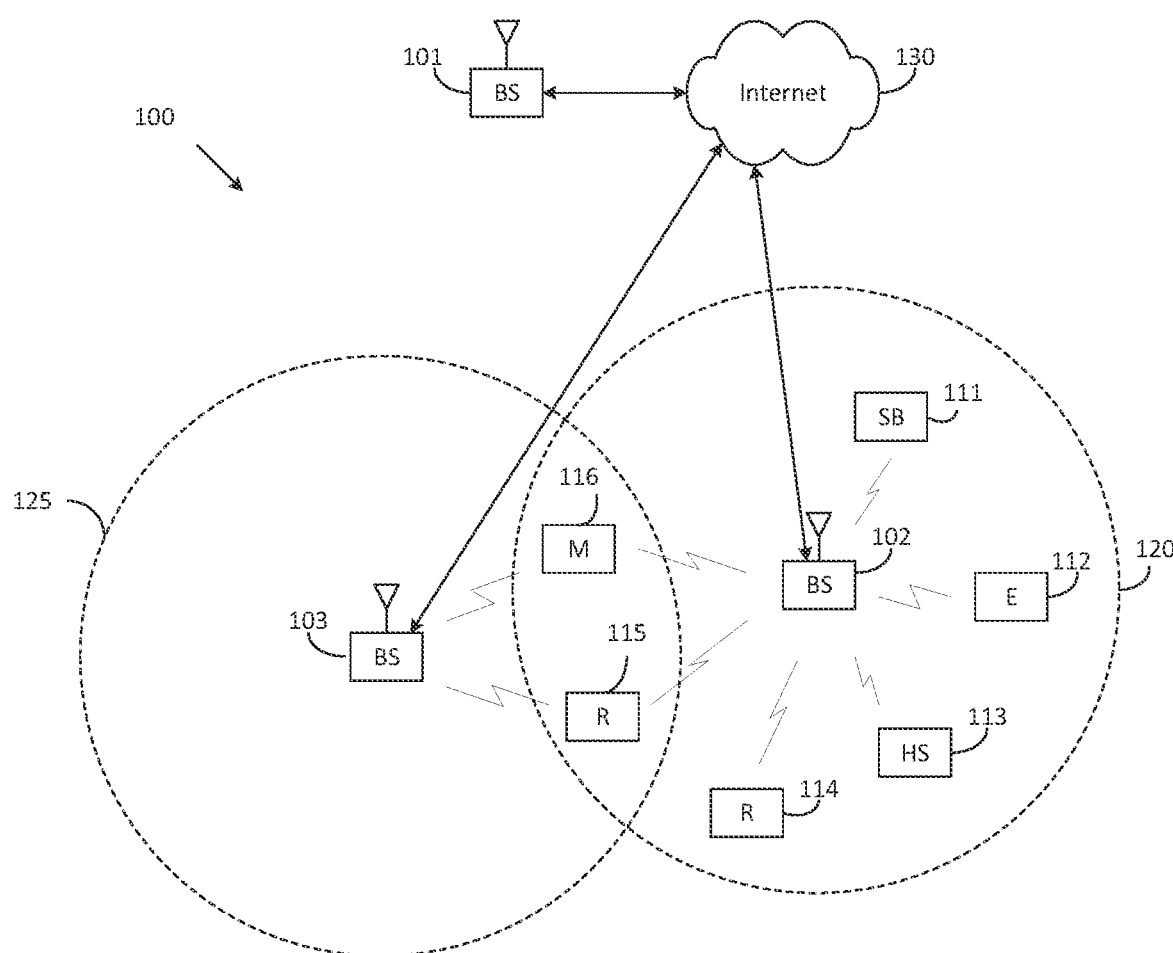
FIG. 1 illustrates an example wireless network according to embodiments of the present disclosure.
Figure 2:
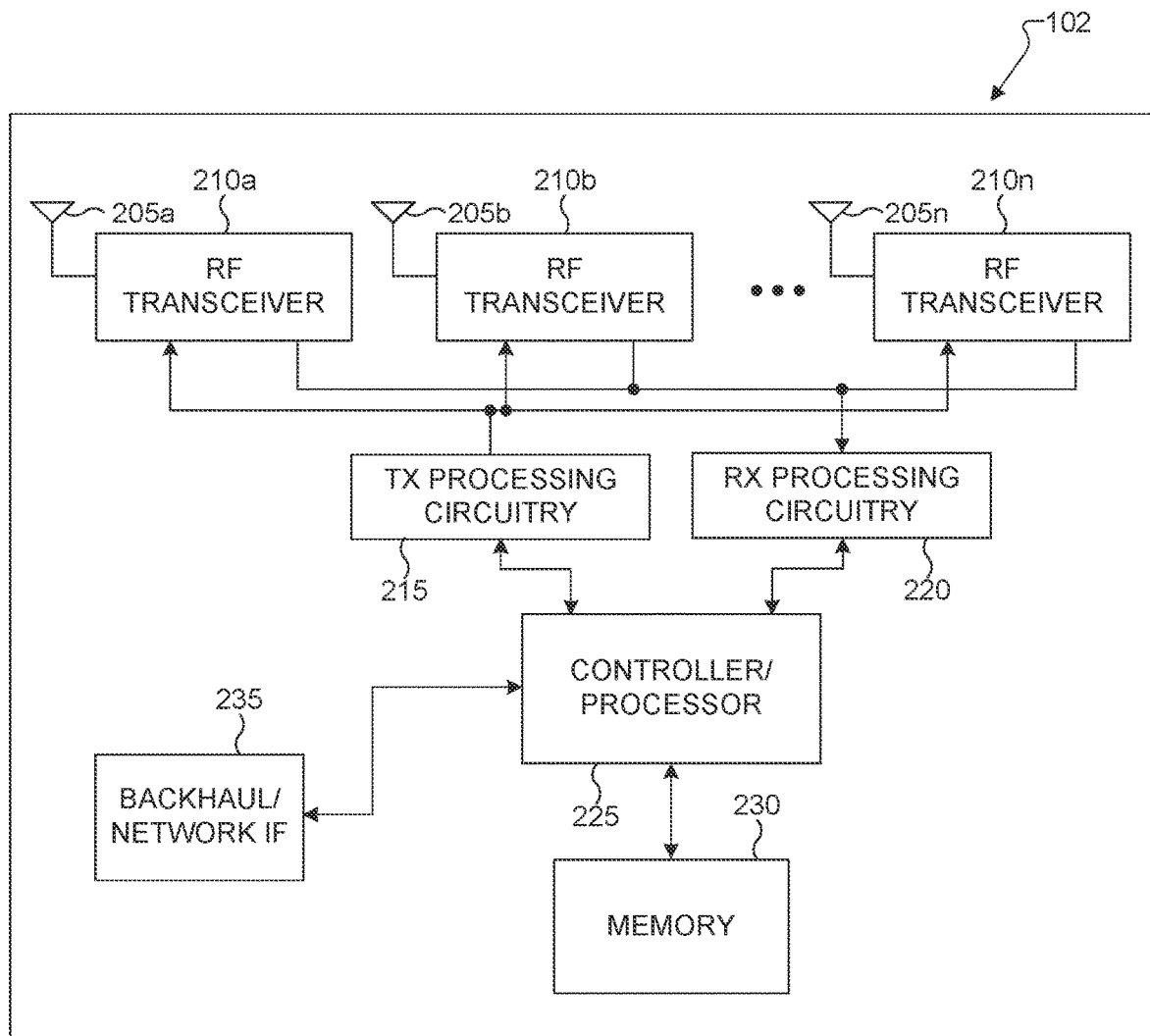
FIG. 2 illustrates an example gNB according to embodiments of the present disclosure.
Figure 3:
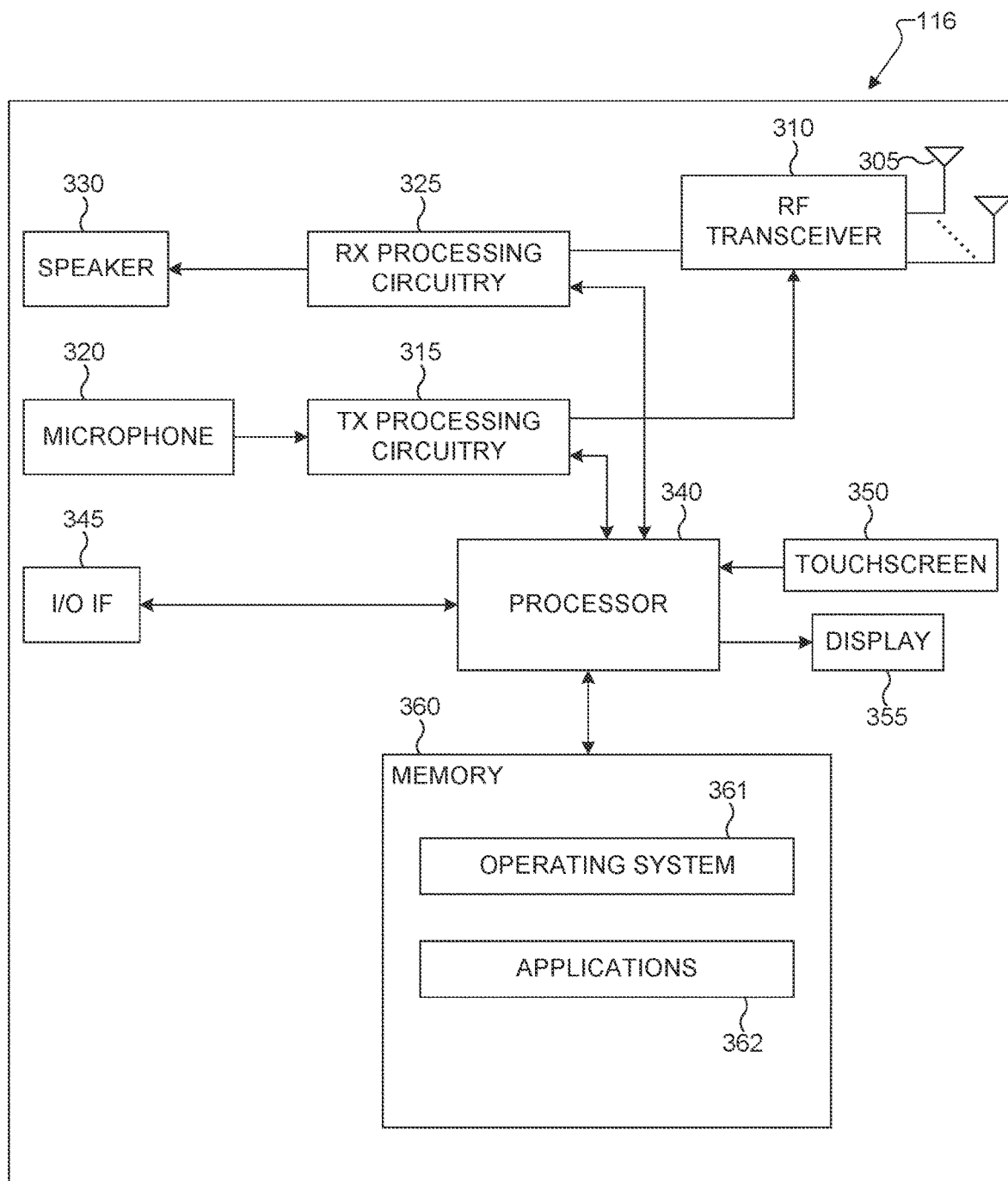
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE"

can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for UEs. In certain embodiments, and one or more of the gNBs 101-103 includes circuitry, programing, or a combination thereof for UEs.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and RX processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz 60 GHz bands, so as to accomplish higher data rates or in lower frequency bands, such as 6 GHz, to enable robust coverage and mobility support. Aspects of the present disclosure may also be applied to deployment of 5G communication system, 6G or even later release which may use terahertz (THz) bands. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used.

For interference measurement reports (IMRs), CSI interference measurement (CSI-IM) resources associated with a zero power CSI-RS (ZP CSI-RS) configuration are used. A CSI process consists of NZP CSI-RS and CSI-IM resources.

A UE can determine CSI-RS transmission parameters through DL control signaling or higher layer signaling, such as RRC signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
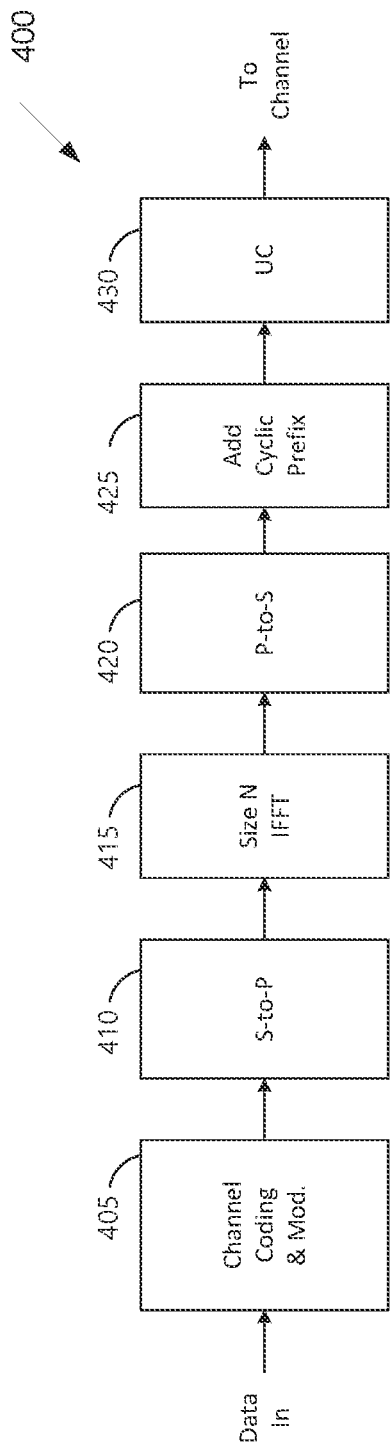
FIG. 4 illustrates an example DL slot structure according to embodiments of the present disclosure.
Figure 5:
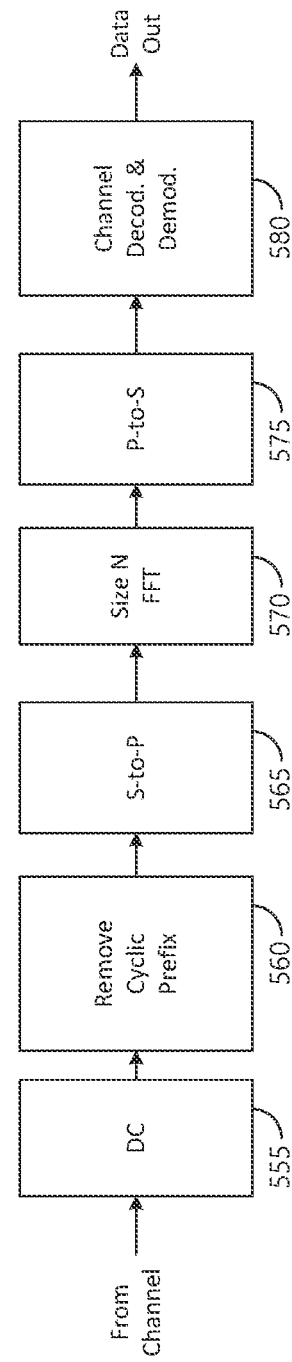
FIG. 5 illustrates an example UL slot structure for PUSCH transmission or PUCCH transmission according to embodiments of the present disclosure.

FIG. 4 and FIG. 5 illustrate example wireless transmit and receive paths according to this disclosure. In the following description, a transmit path 400 may be described as being implemented in an gNB (such as gNB 102), while a receive path 500 may be described as being implemented in a UE (such as UE 116). However, it may be understood that the receive path 500 can be implemented in an gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 400, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to gNBs 101-103 and may implement the receive path 500 for receiving in the downlink from gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

The present disclosure focuses on the mechanism and methodology for indexing of SS/PBCH block (SSB) on the unlicensed spectrum, which includes two set of indexing, and potential impact of the indexing of SS/PBCH block when utilizing the indexing methods on the unlicensed spectrum.

The present disclosure focuses on indexing of SS/PBCH blocks on unlicensed spectrum, wherein the unlicensed spectrum can refer to spectrum operated in a shared channel access manner.

For an operation with shared spectrum channel access, an SS/PBCH block can be associated with at least one transmission opportunities, in order to resist the negative impact from listen-before talk (LBT) on the channel access opportunities. An illustration of the multiple transmission opportunities for SS/PBCH block in a window is shown in FIG. 6, wherein the interval between neighboring allowed candidate SS/PBCH block locations in the window (e.g., Q in the figure) can be known to UE (e.g., either by configuration or fixed assumption, depending on the application scenario) and the candidate SS/PBCH blocks with the interval of Q are quasi co-located (QCLed).

Figure 6:
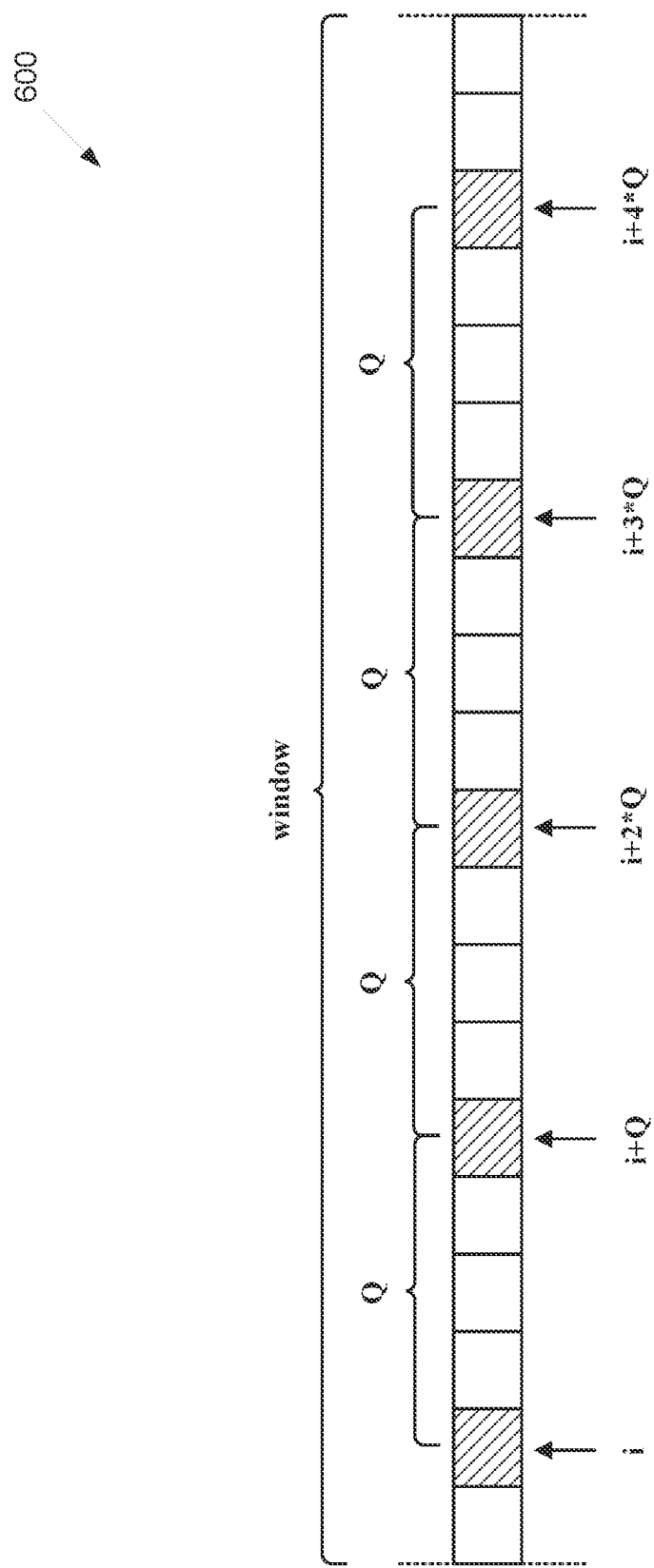
FIG. 6 illustrates example multiple transmission opportunities for SS/PBCH block according to embodiments of the present disclosure.

FIG. 6 illustrates example multiple transmission opportunities for SS/PBCH block 600 according to embodiments of the present disclosure. An embodiment of the multiple transmission opportunities for SS/PBCH block 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions.

In one embodiment, two sets of indexing for SS/PBCH blocks can be supported, wherein the first set of indexing represents the index of candidate SS/PBCH block within a time period (e.g., a half frame), and the window is confined within the time period with a maximum duration same as the time period; and the second set of indexing represents the index of SS/PBCH blocks within a group of Q SS/PBCH blocks, wherein no further QCL assumption is applicable within the group of Q SS/PBCH blocks.

In one example, the first set of indexing (e.g., each index in the set is termed as "first index of SS/PBCH block" in the disclosure) is denoted as I_SSB1, where $0 \leq I\_SSB1 \leq \overline{L}_{max}-1$, and $\overline{L}_{max}$ is the maximum number of candidate SS/PBCH blocks in the time period (e.g., a half frame). For one instance, for operation with shared channel spectrum access, $\overline{L}_{max}=20$ for 30 kHz SCS, and $\overline{L}_{max}=10$ for 15 kHz SCS. For another instance, for operation without shared channel spectrum, $\overline{L}_{max}=L_{max}$, where $L_{max}$ is the maximum number of SS/PBCH blocks to be transmitted in the time period (e.g., a half frame).

In another example, the second set of indexing (e.g., each index in the set is termed as "second index of SS/PBCH block" in the disclosure) is denoted as I_SSB2, where $0 \leq I\_SSB1 \leq Q-1$, and Q is the QCL assumption parameter defined with a unit of the number of candidate SS/PBCH blocks. For instance, the value of Q is provided to the UE for a given cell, wherein the value could be indicated in system information for a serving cell and indicated in system information and/or RRC parameter for a neighboring cell.

In one example, the first set of indexing refers to "index of candidate SS/PBCH block in a half frame" or "index of candidate SS/PBCH block per half frame" or "index of candidate SS/PBCH block," or "candidate SS/PBCH block index," and the second set of indexing refers to "SS/PBCH block index" or "index of SS/PBCH block," or "index of QCLed SS/PBCH block group."

In one example, the first index of SS/PBCH block and the second index of SS/PBCH block have a mapping relationship.

For one example, for an operation with shared channel spectrum, for a giving first index I_SSB1, the corresponding second index can be determined as I_SSB2=I_SSB1 mod Q, wherein Q is the QCL parameter. In one variant to this example, the corresponding second index can be determined as I_SSB2=I_DMRS mod Q, wherein I_DMRS is the index of DM-RS sequence of PBCH in the corresponding SS/PBCH block determined by I_DMRS=I_SSB1 mod L_max, and L_max is the maximum number of SS/PBCH blocks per half frame (e.g., L_max=8 for carrier frequency range between 3 GHz to 7 GHz). Note that the variant to this example gives the same value of I_SSBs, when Q is dividable by L_max.

For another example, for an operation without shared channel spectrum, for a giving first index I_SSB1, the corresponding second index can be determined as I_SSB2=I_SSB1, e.g., the two indices are the same.

Figure 7:
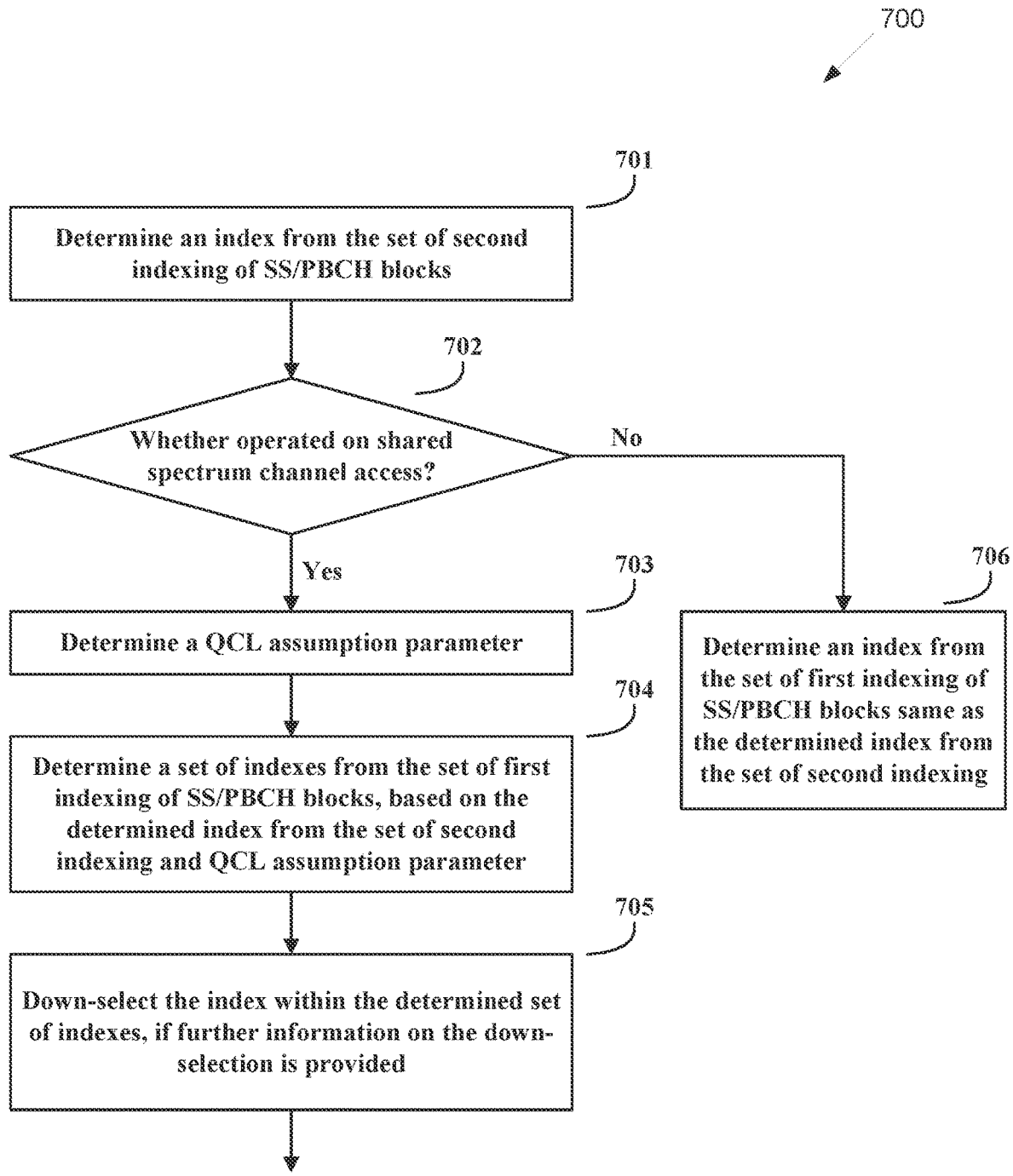
FIG. 7 illustrates a flowchart of a method for determining first set of indexing of SS/PBCH blocks based on a given index from the second set of indexing of SS/PBCH block according to embodiments of the present disclosure.

FIG. 7 illustrates a flowchart of a method 700 for determining first set of indexing of SS/PBCH blocks based on a given index from the second set of indexing of SS/PBCH block according to embodiments of the present disclosure. An embodiment of the method 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

For yet another example, for an operation with shared channel spectrum, for a given second index I_SSB2, the corresponding first index can be determined as a set of indexes (or a subset depending on whether further information on the down-selection is provided), wherein the set of indexes is given by I_SSB2+k*Q, where k is from {0, 1, 2, . . . } such that $I\_SSB2+k*Q \leq \overline{L}_{max}-1$, wherein Q is the QCL parameter.

For yet another example, for an operation without shared channel spectrum, for a giving second index I_SSB2, the corresponding first index can be determined as I_SSB1=I_SSB2, e.g., the two indices are the same.

In one example, the determined set of indexes for the first indexing of SS/PBCH blocks can be different based on a different value and/or use case of Q. For example, if Q is configured for a given cell (e.g., either a serving cell or a neighboring cell), then the determined set of indexes for the first indexing of SS/PBCH blocks can be separately determined for that given cell. For another example, Q is assumed as the configured QCL parameter from serving cell, unless there is an explicit indication of the Q for neighboring cell (e.g., neighboring cell radio resource management (RRM) measurement).

In another example, for an operation with shared channel spectrum, for a given second index I_SSB2, the determined set of indexes for the first indexing of SS/PBCH blocks can be further down-selected if further information is provided to the UE.

In one example, the further information on the down-selection can be the transmission window for SS/PBCH blocks for a serving cell, such that the set of indexes for the first indexing correspond to SS/PBCH blocks with candidate index I_SSB2+k*Q confined within the transmission window, e.g., I_SSB2+k*Q≤N_SSB−1, wherein N_SSB corresponds to the number of candidate SS/PBCH blocks within the configured transmission window, and Q is indicated to the UE for the serving cell.

In another example, the further information on the down-selection can be the measurement window for SS/PBCH blocks, such that the set of indexes for the first indexing correspond to candidate SS/PBCH blocks with index I_SSB2+k*Q confined within the measurement window, e.g., I_SSB2+k*Q≤N_SSB'−1, wherein N_SSB' is the number of candidate SS/PBCH blocks within the configured measurement window, and Q is indicated to the UE for the given cell to be measured.

In yet another example, the further information on the down-selection can be the channel occupancy indicated to the UE (e.g., by group common—physical downlink control channel (GC-PDCCH)), such that the set of indexes for the first indexing correspond to SS/PBCH blocks with candidate index I_SSB2+k*Q confined within the channel occupancy.

In yet another example, the further information on the down-selection can be an indication of whether candidate SS/PBCH block(s) are transmitted or not (e.g., by DCI format), such that the set of indexes for the first indexing correspond to candidate SS/PBCH blocks with index I_SSB2+k*Q indicated to be transmitted.

In yet another example, the further information on the down-selection can be an indication of whether candidate SS/PBCH block(s) are transmitted or not (e.g., by DCI format), such that the set of indexes for the first indexing correspond to candidate SS/PBCH blocks with index I_SSB2+k*Q not indicated to be not transmitted.

In yet another example, the set of indexes for the first indexing can be determined based on combination of above examples, when the corresponding further information on the down-selection is provided to the UE.

where $\bar{i}_{SSB}$ is the 3 LSBs of the first index of SS/PBCH block (i.e., candidate SS/PBCH block index) for $L_{max} \geq 8$ (e.g., for operation with shared spectrum channel access, $L_{max}=10$ or 20), and a combination of half frame indicator and the 2 LSBs of the first index of SS/PBCH block (i.e., candidate SS/PBCH block index) for $L_{max}=4$.

For another example, when $L_{max} \geq 8$, the bits other than 3 LSBs of the first index of SS/PBCH block can be carried by the payload of PBCH in the corresponding SS/PBCH block, wherein the first index of SS/PBCH block is the candidate SS/PBCH block index. TABLE 1 shows the generation of the payload of PBCH.

TABLE 1

The generation of the payload of PBCH if $L_{max}=10$
　　$\bar{a}_{\bar{A}+6}$ is reserved.
　　$\bar{a}_{\bar{A}+7}$ is the MSB of the first index of SS/PBCH block, wherein the first index of SS/PBCH block is the candidate SS/PBCH block index.
else if $L_{max}=20$
　　$\bar{a}_{\bar{A}+6}$, $\bar{a}_{\bar{A}+7}$ are the 2 MSBs of the first index of SS/PBCH block, wherein the first index of SS/PBCH block is the candidate SS/PBCH block index.
else if $L_{max}=64$
　　$\bar{a}_{\bar{A}+5}$, $\bar{a}_{\bar{A}+6}$, $\bar{a}_{\bar{A}+7}$ are the 3 MSBs of the first index of SS/PBCH block, wherein the first index of SS/PBCH block is the candidate SS/PBCH block index.
end if An example flowchart for determining the first set of indexing of SS/PBCH blocks based on a given index from the second set of indexing of SS/PBCH block is shown in FIG. 7.

Figure 8:
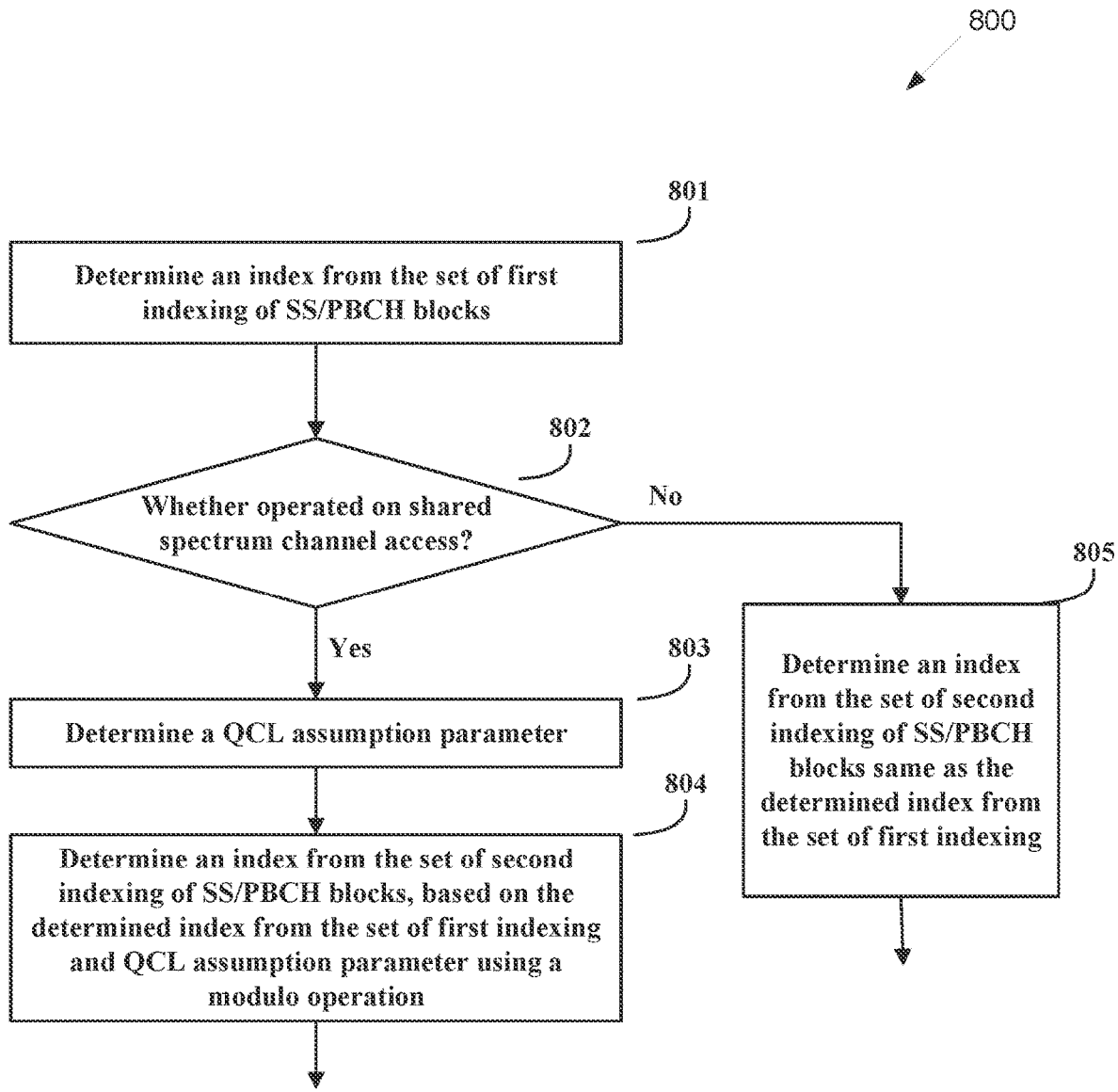
FIG. 8 illustrates a flowchart of a method for determining second set of indexing of SS/PBCH blocks based on a given index from the first set of indexing of SS/PBCH block according to embodiments of the present disclosure.

FIG. 8 illustrates a flowchart of a method 800 for determining second set of indexing of SS/PBCH blocks based on a given index from the first set of indexing of SS/PBCH block according to embodiments of the present disclosure. An embodiment of the method 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

In one embodiment, the first set of indexing for SS/PBCH blocks can be utilized for timing determination, and the corresponding signal/channel generation.

For one example, the 3 least significant bits (LSBs) of the first index of SS/PBCH block can be carried by the DM-RS sequence of PBCH in the corresponding SS/PBCH block, wherein the first index of SS/PBCH block is the candidate SS/PBCH block index.

For example, the UE may assume the reference-signal sequence r(m) for an SS/PBCH block is defined by $$r(m) = \frac{1}{\sqrt{2}}(1 - 2 \cdot c(2m)) + j\frac{1}{\sqrt{2}}(1 - 2 \cdot (2m+1))$$

where the scrambling sequence generator may be initialized at the start of each SS/PBCH block occasion with $$c_{init} = 2^{11}(\bar{i}_{SSB}+1)\left(\left\lfloor \frac{N_{ID}^{Cell}}{4} \right\rfloor + 1\right) + 2^6(\bar{i}_{SSB}+1) + (N_{ID}^{cell} \bmod 4)$$

For yet another example, the scrambling sequence of PBCH, after rate matching and before modulation, is based on the 3 LSBs of the first index of SS/PBCH block (e.g., for operation with shared spectrum channel access, $L_{max}=10$ or 20), wherein the first index of SS/PBCH block is the candidate SS/PBCH block index.

For example, the UE may assume the block of bits b(0), . . . , b($M_{bit}-1$), where $M_{bit}$ is the number of bits transmitted on the physical broadcast channel, are scrambled prior to modulation, resulting in a block of scrambled bits $\tilde{b}(0), \ldots, \tilde{b}_{bit}-1$) according to $\tilde{b}(i)=(b(i)+c(i+vM_{bit})) \bmod 2$ where the scrambling sequence may be initialized with $c_{init}=N_{ID}^{cell}$ at the start of each SS/PBCH block and, v is the 3 LSBs of the first index of SS/PBCH block index when $L_{max} \geq 8$ (e.g., for operation with shared spectrum channel access, $L_{max}=10$ or 20), and the 2 LSBs of the first index of SS/PBCH block when $L_{max}=4$, wherein the first index of SS/PBCH block is the candidate SS/PBCH block index.

For yet another example, for an operation with shared spectrum channel access, for each SS/PBCH block with the first index of SS/PBCH block, wherein the first index of SS/PBCH block is the candidate SS/PBCH block index, there can be associated slot(s) containing Type-PDCCH monitoring occasions.

For example, for a first index of SS/PBCH block (i.e., candidate SS/PBCH block index) $\bar{i}$, where $0 \leq \bar{i} \leq L_{max}-1$ (e.g., for operation with shared spectrum channel access, $L_{max}=10$ or 20), two consecutive slots starting from slot $n_0$ include the associated Type0-PDCCH monitoring occasions. The UE determines an index of slot $n_0$ as $n_0=(0 \cdot 2^\mu + \lfloor \bar{i} \cdot M \rfloor) \bmod N_{slot}^{frame,\mu}$ that is in a frame with system frame number (SFN) $SFN_C$ satisfying $SFN_C \bmod 2=0$ if $\lfloor (0 \cdot 2^\mu + \lfloor \bar{i} \cdot M \rfloor)/N_{slot}^{frame,\mu} \rfloor \bmod 2=0$, or in a frame with SFN satisfying $SFN_C \bmod 2=1$ if $\lfloor (0 \cdot 2^\mu + \lfloor \bar{i} \cdot M \rfloor)/N_{slot}^{frame,\mu} \rfloor \bmod 2=1$.

For yet another example, the scrambling sequence of PBCH payload is based on first index of SS/PBCH block, wherein the first index of SS/PBCH block is the candidate SS/PBCH block index. TABLE 2 shows the scrambling of PBCH payload.

TABLE 2

Scrambling of PBCH payload while i < A
  if $a_i$ corresponds to any one of the bits belonging to the first index of SS/PBCH block (i.e.,
    candidate SS/PBCH block index), the half frame index, and $2^{nd}$ and $3^{rd}$ least significant
    bits of the system frame number
    $s_i = 0$;
  else
    $s_i = c(j + vM)$;
    j = j + 1;
  end if
  i = i + 1;
end while The scrambling sequence c(i) is initialized with $c_{init} = N_{ID}^{cell}$ at the start of each SFN satisfying mod(SFN,8)=0; and M=A-3 for $L_{max} \leq 8$ (e.g., $L_{max}=4$ or $L_{max}=8$), M=A-4 for $8 < L_{max} \leq 16$ (e.g., $L_{max}=10$, which can be for operation with shared spectrum channel access), M=A-5 for $16 < L_{max} \leq 32$ (e.g., $L_{max}=20$, which can be for operation with shared spectrum channel access), M=A-6 for $L_{max}=64$, where $L_{max}$ is the number of candidate SS/PBCH blocks in a half frame.

In one embodiment, the second set of indexing for SS/PBCH blocks can be utilized for procedures related to QCL assumption, and/or determining the candidate SS/PBCH blocks corresponding to the second index of SS/PBCH block, wherein the candidate SS/PBCH blocks can be used for determining the potentially transmission of SS/PBCH blocks, in order to perform at least one of PDSCH resource allocation, RACH occasion (RO) validation, PDCCH validation, or physical uplink control channel (PUCCH) validation.

For one example, the second index of SS/PBCH block can be utilized as determining the resources associated with a physical random access channel (PRACH).

For one example, the PRACH occasions are mapped consecutively per corresponding second index of SS/PBCH block, wherein the second index of SS/PBCH block can be a SS/PBCH block index. The indexing of the PRACH occasion indicated by the mask index value is reset per mapping cycle of consecutive PRACH occasions per the second index of SS/PBCH block. The UE selects for a PRACH transmission the PRACH occasion indicated by PRACH mask index value for the indicated second index of SS/PBCH block in the first available mapping cycle.

For another example, for a PRACH transmission initiated by a PDCCH order, the field in DCI format 1_0, utilized for indicating the SS/PBCH blocks that may be used to determine the RACH occasion for the PRACH transmission, can refer to the second index of SS/PBCH block, wherein the second index of SS/PBCH block can be a SS/PBCH block index.

For yet another example, for a PRACH transmission triggered by higher layers, the index of resources provided by ssb-ResourceList can refer to the second index of SS/PBCH block, wherein the second index of SS/PBCH block can be a SS/PBCH block index.

In one example, the indicated second index of SS/PBCH block could correspond to at least one candidate SS/PBCH blocks, wherein the set of first indexes of the at least one candidate SS/PBCH blocks can be determined according to the approaches specified in this disclosure. The at least one candidate SS/PBCH blocks are all associated with the PRACH occasion(s) specified in this example.

In another example, aspect for example(s) of this approach, when determining the set of first indexes of the at least one candidate SS/PBCH blocks, the value of QCL parameter (Q) can be the one configured for a serving cell.

In yet another example, the second index of SS/PBCH block can be utilized for determining the resources for radio link monitoring, wherein the second index of SS/PBCH block can be a SS/PBCH block index.

For example, for operation with shared spectrum channel access, the UE is expected to perform radio link management (RLM) using the associated SS/PBCH block when the second index of SS/PBCH block is provided by RadioLink-MonitoringRS, wherein the second index of SS/PBCH block can be SS/PBCH block index.

In one example, the provided second index of SS/PBCH block could correspond to at least one candidate SS/PBCH blocks, wherein the set of first indexes of the at least one candidate SS/PBCH blocks can be determined according to the approaches specified in this disclosure. The UE can perform RLM based on the at least one candidate SS/PBCH blocks.

For another example, for operation with shared spectrum channel access, when a UE is provided a second index of SS/PBCH block (i.e., SS/PBCH block index) by ssb-Index, the UE is expected to perform radio link monitoring using SS/PBCH block(s) in a discovery burst transmission window and with first index(es) of SS/PBCH block (i.e., candidate SS/PBCH block indexes) corresponding to the second index of SS/PBCH block (i.e., SS/PBCH block index) provided by ssb-Index.

In another example, when determining the set of first indexes of the at least one candidate SS/PBCH blocks, the value of QCL parameter (Q) can be the one configured for a serving cell.

For yet another approach, the second index of SS/PBCH block can be utilized for link recovery procedures, wherein the second index of SS/PBCH block can be SS/PBCH block index For example, a UE can be provided, for each BWP of a serving cell, a set $\bar{q}_0$ of periodic CSI-RS resource configuration indexes by failureDetectionResources and a set $\bar{q}_1$ of periodic CSI-RS resource configuration indexes and/or the second index of SS/PBCH blocks by candidateBeamRSList for radio link quality measurements on the BWP of the serving cell, wherein the second index of SS/PBCH block can be a SS/PBCH block index.

In one example, the second index of SS/PBCH block could correspond to at least one candidate SS/PBCH blocks, wherein the set of first indexes of the at least one candidate SS/PBCH blocks can be determined according to the approaches specified in this disclosure. The UE can perform link recovery based on the at least one candidate SS/PBCH blocks.

In another example, when determining the set of first indexes of the at least one candidate SS/PBCH blocks, the value of QCL parameter (Q) can be the one configured for a serving cell.

For yet another example, the second index of SS/PBCH block can be utilized for indexing the RS for UL power control, wherein the second index of SS/PBCH block can be SS/PBCH block index.

For example, for any of PUSCH, PUCCH, or sounding reference signal (SRS), the set of RS resource indexes can include one or both of a set of second indexes of SS/PBCH block, each provided by ssb-Index when a value of a corresponding RS ID maps to a second index of SS/PBCH block, wherein the second index of SS/PBCH block can be a SS/PBCH block index.

In one example, the second index of SS/PBCH block could correspond to at least one candidate SS/PBCH blocks, wherein the set of first indexes of the at least one candidate SS/PBCH blocks can be determined according to the approaches specified in this disclosure. The UE can perform UL power control based on the at least one candidate SS/PBCH blocks.

In another example, when determining the set of first indexes of the at least one candidate SS/PBCH blocks, the value of QCL parameter (Q) can be the one configured for a serving cell.

For yet another example, the second index of SS/PBCH block can be utilized for indexing the RS for UL spatial relation information, wherein the second index of SS/PBCH block can be SS/PBCH block index For example, for any of PUSCH, PUCCH, or SRS, the set of RS resource indexes associated with the configuration of the spatial setting for UL transmission can be the second index of SS/PBCH block.

In one example, the second index of SS/PBCH block could correspond to at least one candidate SS/PBCH blocks, wherein the set of first indexes of the at least one candidate SS/PBCH blocks can be determined according to the approaches specified in this disclosure. The UE can determine spatial relation information based on the at least one candidate SS/PBCH blocks.

In another example, when determining the set of first indexes of the at least one candidate SS/PBCH blocks, the value of QCL parameter (Q) can be the one configured for a serving cell.

In yet another example, the second index of SS/PBCH block can be utilized for beam failure recovery, wherein the second index of SS/PBCH block can be SS/PBCH block index.

For example, when configuring the index of resource of SS/PBCH block for beam failure recovery purpose, e.g., BFR-SSB-Resource, the second index of SS/PBCH block can be used, wherein the second index of SS/PBCH block can be a SS/PBCH block index.

In one example, the second index of SS/PBCH block could correspond to at least one candidate SS/PBCH blocks, wherein the set of first indexes of the at least one candidate SS/PBCH blocks can be determined according to the approaches specified in this disclosure.

In another example, when determining the set of first indexes of the at least one candidate SS/PBCH blocks, the value of QCL parameter (Q) can be the one configured for a serving cell.

In yet another example, the second index of SS/PBCH block can be utilized for determining QCL assumption using SS/PBCH block as source RS, wherein the second index of SS/PBCH block can be SS/PBCH block index.

For one example, if the RS configured in TCI-State for determining QCL assumption is an SS/PBCH block, the second index of SS/PBCH block can be utilized, wherein the second index of SS/PBCH block can be a SS/PBCH block index.

For another example, if RS configured for SRS for determining QCL assumption is an SS/PBCH block, the second index of SS/PBCH block can be utilized, wherein the second index of SS/PBCH block can be a SS/PBCH block index.

For yet another example, if RS configured for CSI-RS, for measurement purpose, for determining QCL assumption is an SS/PBCH block, the second index of SS/PBCH block can be utilized, wherein the second index of SS/PBCH block can be a SS/PBCH block index.

In one example, the second index of SS/PBCH block could correspond to at least one candidate SS/PBCH blocks, wherein the set of first indexes of the at least one candidate SS/PBCH blocks can be determined according to the approaches specified in this disclosure.

In another example, when determining the set of first indexes of the at least one candidate SS/PBCH blocks, the value of QCL parameter (Q) can be the one configured for a serving cell.

In yet another example, the second index of SS/PBCH block can be utilized for indexing RS for RRM measurement, wherein the second index of SS/PBCH block can be SS/PBCH block index.

For one example, when determining the ssb-Index-RSRP, the second index of SS/PBCH block can be utilized, wherein the second index of SS/PBCH block can be SS/PBCH block index.

For another example, when reporting the measurement results for SS/PBCH block, e.g., in ResultsPerSSB-Index, the second index of SS/PBCH block can be utilized.

For yet another example, for determining the SS/PBCH block to be measured, e.g., ssb-ToMeasure, associated with an SSB based measurement timing configuration (SMTC), the second index of SS/PBCH block can be utilized.

In one example, the indicated second index of SS/PBCH block could correspond to at least one candidate SS/PBCH blocks, wherein the set of first indexes of the at least one candidate SS/PBCH blocks can be determined according to the approaches specified in this disclosure.

For one instance, the i-th bit from left of bitmap of ssb-ToMeasure indicates a second index of SS/PBCH block (i.e., SS/PBCH block index) as i−1. For each indicated second index of SS/PBCH block (i.e., SS/PBCH block index) provided by ssb-ToMeasure, the UE can derive a set of SS/PBCH blocks within the associated SMTC window and with the first index of SS/PBCH block (i.e., candidate SS/PBCH block index) corresponding to the second index of SS/PBCH block (i.e., SS/PBCH block index). The UE can perform RRM measurement according to the derived all sets of SS/PBCH blocks corresponding to all the indicated second index(es) of SS/PBCH block (i.e., SS/PBCH block index) provided by ssb-ToMeasure.

In another example, when determining the set of first indexes of the at least one candidate SS/PBCH blocks, the value of QCL parameter (Q) can be the one configured for a serving cell for serving cell measurement, and be the one configured for a neighboring cell for neighboring cell measurement.

For yet another example, the second index of SS/PBCH block can be utilized for indexing potentially transmitted SS/PBCH blocks in a burst, wherein the second index of SS/PBCH block can be SS/PBCH block index.

For example, the indexing associated with ssb-PositionsInBurst in system information block 1 (SIB1) and/or ssb-PositionsInBurst in ServingCellConfigCommon can refer to the second index of SS/PBCH block (i.e., SS/PBCH block index), which can be further utilized for determining monitoring behavior of a PDCCH candidate, and/or RO validation, and/or resource allocation for PDSCH, and/or validation for UL signal/channels.

In one example, the second index of SS/PBCH block (i.e., SS/PBCH block index) could correspond to at least one candidate SS/PBCH blocks, wherein the set of first indexes of the at least one candidate SS/PBCH blocks can be determined according to the approaches specified in this disclosure. The UE can index the potentially transmitted SS/PBCH blocks in a burst based on the at least one candidate SS/PBCH blocks.

For one instance of this example, the i-th bit from left of bitmap of ssb-PositionsInBurst indicates a second index of SS/PBCH block (i.e., SS/PBCH block index) as i−1, and a UE can further derive that SS/PBCH blocks within the transmission window and with first index of SS/PBCH block (i.e., candidate SS/PBCH block index) corresponding to a second index of SS/PBCH block (i.e., SS/PBCH block index) indicated by ssb-PositionsInBurst can be potentially transmitted.

In another, when determining the set of first indexes of the at least one candidate SS/PBCH blocks, the value of QCL parameter (Q) can be the one configured for a serving cell (e.g., provided by a higher layer parameter for a serving cell).

In yet another example, for an operation with shared spectrum channel access, a SS/PBCH block symbol is a symbol corresponding to SS/PBCH block in a discovery burst transmission window and with the first index of SS/PBCH block (i.e., candidate SS/PBCH block index) corresponding to the second index of SS/PBCH block (i.e., SS/PBCH block index) indicated to a UE by ssb-PositionsInBurst in SIB1, or by ssb-PositionsInBurst in ServingCellConfigCommon.

In yet another example, for an operation with shared spectrum channel access, if the UE has received ssb-PositionsInBurst in SIB1 and has not received ssb-PositionsInBurst in ServingCellConfigCommon for a serving cell and if the UE does not monitor PDCCH candidates in a Type0-PDCCH CSS set and at least one resource element (RE) for a PDCCH candidate overlaps with at least one RE of a SS/PBCH block within a discovery burst transmission window and the first index of SS/PBCH block (i.e., candidate SS/PBCH block index) corresponding to the second index of SS/PBCH block (i.e., SS/PBCH block index) provided by ssb-PositionsInBurst in SIB1 the UE is not required to monitor the PDCCH candidate.

In yet another example, for an operation with shared spectrum channel access, if a UE has received ssb-PositionsInBurst in ServingCellConfigCommon, for a serving cell and if the UE does not monitor PDCCH candidates in a Type0-PDCCH CSS set and at least one RE for a PDCCH candidate overlaps with at least one RE of a SS/PBCH block within a discovery burst transmission window and with the first index of SS/PBCH block (i.e., candidate SS/PBCH block index) corresponding to the second index of SS/PBCH block (i.e., SS/PBCH block index) provided by ssb-PositionsInBurst in ServingCellConfigCommon, the UE is not required to monitor the PDCCH candidate.

In yet another example, for an operation on a single carrier in unpaired spectrum and with shared spectrum channel access, for a set of symbols of a slot that corresponds to SS/PBCH block(s) within a discovery burst transmission window and with the first index of SS/PBCH block (i.e., candidate SS/PBCH block index) corresponding to the second index of SS/PBCH block (i.e., SS/PBCH block index) indicated to a UE by ssb-PositionsInBurst in SIB1 or ssb-PositionsInBurst in ServingCellConfigCommon, for reception of SS/PBCH blocks, the UE does not transmit PUSCH, PUCCH, PRACH in the slot if a transmission would overlap with any symbol from the set of symbols and the UE does not transmit SRS in the set of symbols of the slot. The UE does not expect the set of symbols of the slot to be indicated as uplink by tdd-UL-DL-ConfigurationCommon, or tdd-UL-DL-ConfigurationDedicated, when provided to the UE.

In yet another example, for an operation with shared spectrum channel access, for a set of symbols of a slot that corresponds to SS/PBCH block(s) within a discovery burst transmission window and with the first index of SS/PBCH block (i.e., candidate SS/PBCH block index) corresponding to the second index of SS/PBCH block (i.e., SS/PBCH block index) indicated to a UE by ssb-PositionsInBurst in SIB1, or by ssb-PositionsInBurst in ServingCellConfigCommon, for reception of SS/PBCH blocks, the UE does not expect to detect a DCI format 2_0 with an SFI-index field value indicating the set of symbols of the slot as uplink.

In yet another example, for an operation with shared spectrum channel access, when receiving the PDSCH scheduled with system information-radio network temporary identifier (SI-RNTI) and the system information indicator in DCI is set to 1, random access-RNTI (RA-RNTI), paging-RNTI (P-RNTI), or temporary cell-RNTI (TC-RNTI), the UE assumes potential SS/PBCH block transmission according to ssb-PositionsInBurst, and if the PDSCH resource allocation overlaps with physical resource blocks (PRBs) containing potential SS/PBCH block transmission resources the UE may assume that the PRBs containing potential SS/PBCH block transmission resources are not available for PDSCH in the OFDM symbols where SS/PBCH block is potentially transmitted. The potential SS/PBCH block transmission is derived by the SS/PBCH block(s) within a discovery burst transmission window and with the first index of SS/PBCH block (i.e., candidate SS/PBCH block index) corresponding to the second index of SS/PBCH block (i.e., SS/PBCH block index) indicated to a UE by ssb-PositionsInBurst.

In yet another example, for an operation with shared spectrum channel access, when receiving PDSCH scheduled by PDCCH with cyclic redundancy check (CRC) scrambled by C-RNTI, modulation coding scheme cell-RNTI (MCS-C-RNTI), configuration scheduling-RNTI (CS-RNTI), or PDSCHs with semi-persistent scheduling (SPS), the REs corresponding to the configured or dynamically indicated resources are not available for PDSCH. Furthermore, the UE assumes potential SS/PBCH block transmission according to ssb-PositionsInBurst if the PDSCH resource allocation overlaps with PRBs containing potential SS/PBCH block transmission resources, the UE may assume that the PRBs containing potential SS/PBCH block transmission resources are not available for PDSCH in the OFDM symbols where SS/PBCH block is potentially transmitted. The potential SS/PBCH block transmission is derived by the SS/PBCH block(s) within a discovery burst transmission window and with the first index of SS/PBCH block (i.e., candidate SS/PBCH block index) corresponding to the second index of SS/PBCH block (i.e., SS/PBCH block index) indicated to a UE by ssb-PositionsInBurst.

The present disclosure focuses on the mechanism and methodology for radio link monitoring on an unlicensed spectrum. The details of this disclosure include the following components: candidate RS location determination for RLM; in-sync (IS) and out-of-sync (OOS) evaluation (IS/OOS) evaluation rule; and a UE procedure for RLM.

The present disclosure focuses on radio link monitoring on unlicensed spectrum, wherein the unlicensed spectrum can refer to spectrum operated in a shared channel access manner.

In one embodiment, for a serving cell, a UE can be configured with at least one index of resource for radio link monitoring (e.g., denoted as RLM-RS), and the UE can determine the resources for RLM based on the index of resource.

In one example, for a serving cell, a UE can be configured with at least one index of RLM-RS resource (e.g., from higher layer parameter RadioLinkMonitoringRS), wherein the RLM-RS resource could be either a SS/PBCH block or CSI-RS for example, and the UE can be configured with a QCL information parameter (e.g., from master information block (MIB), or SIBx, or higher layer parameter), then the UE can determine a set of resources for RLM based on the configured at least one index of RLM-RS resource as well as the QCL information parameter.

For this example, denote the time-domain location of one configured RLM-RS resource as i, and denote the configured QCL information parameter as Q, then the set of time-domain location of resources for RLM is determined as i+Q*k, wherein k=0, 1, . . . , such that the corresponding time-domain location of the RLM-RS is within the RLM measurement window.

In one example, the RLM measurement window is the same as the transmission window for discovery signals and channels (DSCH), wherein the DSCH includes SS/PBCH blocks and/or configurable CSI-RS.

Figure 9:
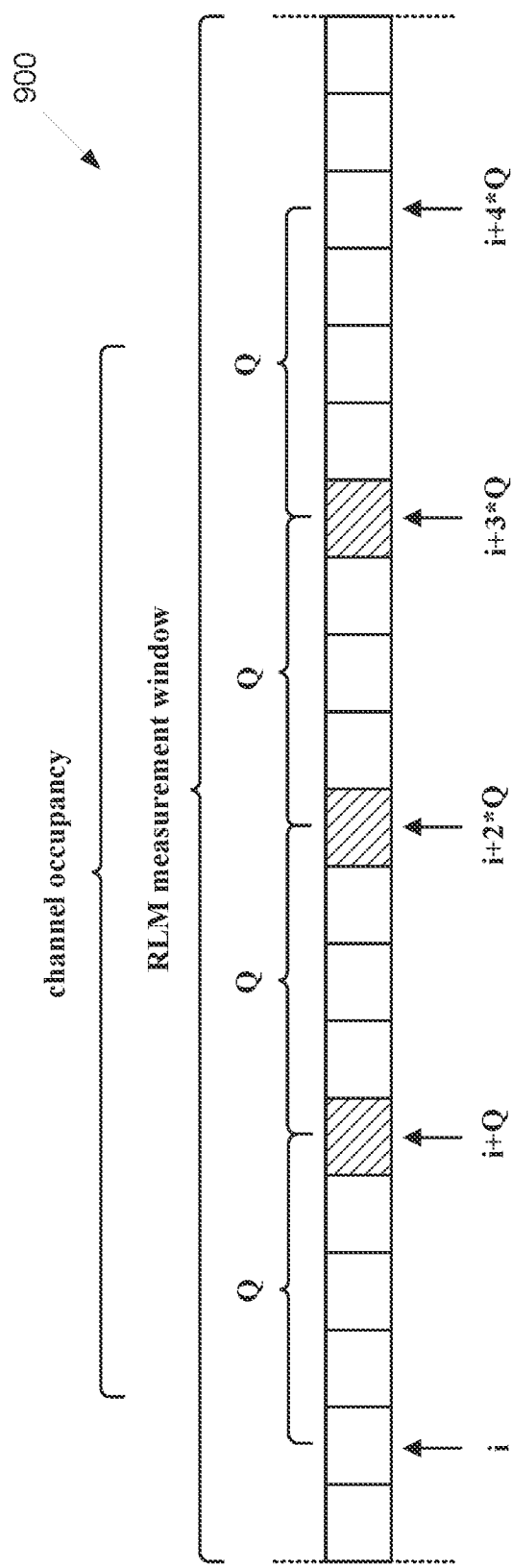
FIG. 9 illustrates an example determination of RLM resources based on CO according to embodiments of the present disclosure.

FIG. 9 illustrates an example determination of RLM resources 900 based on CO according to embodiments of the present disclosure. An embodiment of the determination of RLM resources 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

For one example, when the configured RLM-RS is an SS/PBCH block, denote the index of one configured SS/PBCH block for RLM as i_SSB, and denote the configured QCL information parameter as Q_SSB, then the set of resources for RLM is determined as i_SSB+Q_SSB*k, wherein k=0, 1, . . . , such that the SS/PBCH block location with index i_SSB+Q_SSB*k is within the RLM measurement window. For an SS/PBCH block with candidate location index j_SSB in the RLM measurement window, the UE determines the SS/PBCH block as part of resources for RLM, if (j_SSB mod Q_SSB)=i_SSB.

For another example, when the configured RLM-RS is CSI-RS, denote the time-domain location of one configured CSI-RS resource for RLM as i_CSI, and denote the configured QCL information parameter as Q_CSI, then the set of the time-domain location of the resources for RLM is determined as i_CSI+Q_CSI*k, wherein k=0, 1, . . . , such that the corresponding time-domain location of the CSI-RS is within the RLM measurement window.

In one example, the configured QCL parameter for an RLM-RS resource as SS/PBCH block (Q_SSB) and the configured QCL parameter for an RLM-RS resource as CSI-RS (Q_CSI) can be separately configured.

In one example, the configured QCL parameter for an RLM-RS resource as CSI-RS (Q_CSI) can be determined based on the configured QCL parameter for a RLM-RS resource as SS/PBCH block (Q_SSB). For example, Q_CSI=Q_SSB/2, in the unit of slot. For one further consideration, this one-to-one mapping only applies when the CSI-RS is QCLed with SS/PBCH block.

In one example, if the UE is configured with channel occupancy information (CO) from serving cell (e.g., from GC-PDCCH), the UE can further down-select the value of k, such that the time-domain location of resources for RLM with index i+Q*k are within the RLM measurement window and within the CO at the same time. For example, when the configured RLM-RS is an SS/PBCH block, an SS/PBCH block with candidate location index j_SSB in the RLM measurement window and within the CO, the UE determines the SS/PBCH block as part of resources for RLM, if (j_SSB mod Q_SSB)=i_SSB.

In one example, all the symbols corresponding the SS/PBCH blocks with index i_SSB+Q_SSB*k are within the RLM measurement window and within the CO at the same time.

In another embodiment, all the symbols containing SSS (e.g., third symbol in the corresponding SS/PBCH block) of the SS/PBCH blocks with index i_SSB+Q_SSB*k are within the RLM measurement window and within the CO at the same time.

Figure 10:
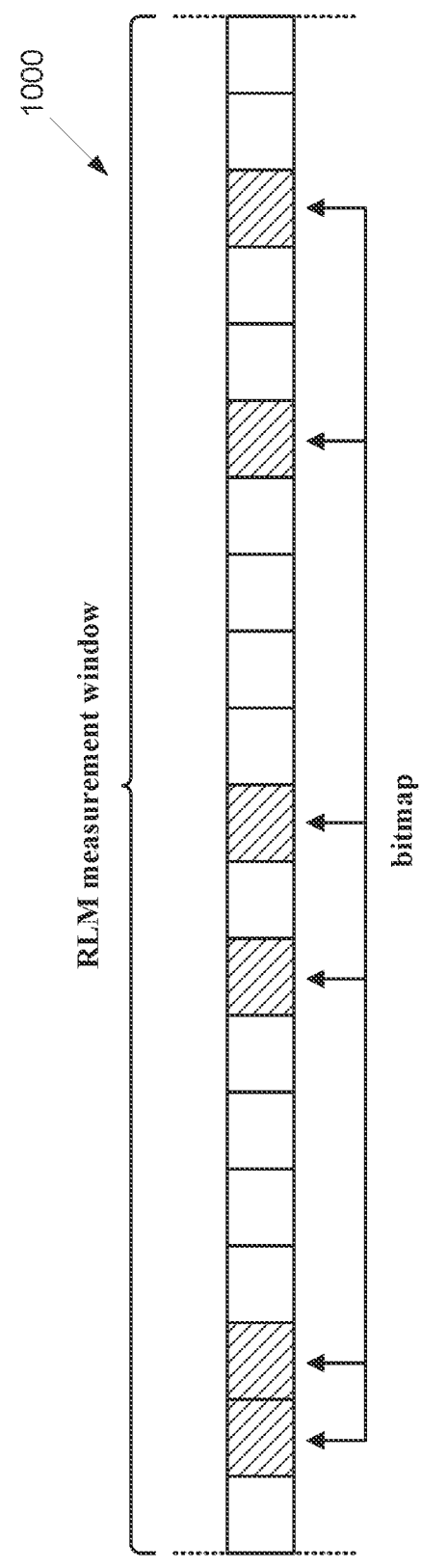
FIG. 10 illustrates an example determination of RLM resources based on bitmap according to embodiments of the present disclosure.

FIG. 10 illustrates an example determination of RLM resources 1000 based on bitmap according to embodiments of the present disclosure. An embodiment of the determination of RLM resources 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

In one example, for a serving cell, a UE can be configured with at least one index of RLM-RS resource using a bitmap, then the UE can determine a set of resources for RLM based on the configured bitmap.

In another example, if the UE is configured with CO from serving cell (e.g., from GC-PDCCH), the UE can further down-select the time-domain location of the RLM-RS resource corresponding to the bitmap such that the corresponding time-domain location of the RLM-RS resource are within the RLM measurement window and within the CO at the same time.

In yet another example, when the configured RLM-RS is an SS/PBCH block, all the symbols corresponding the SS/PBCH blocks are within the RLM measurement window and within the CO at the same time.

In yet another example, when the configured RLM-RS is an SS/PBCH block, all the symbols containing a secondary synchronization signal (SSS) (e.g., third symbol in the corresponding SS/PBCH block) of the SS/PBCH blocks are within the RLM measurement window and within the CO at the same time.

In one example, RLM-RS(s) within the configured RLM measurement window are used for IS/OOS evaluation.

In one example, a UE does not expect to be configured with RLM-RS outside the RLM measurement window.

In another example, there could be RLM-RS(a) outside the configured RLM measurement window, and the RLM-RS(a) outside the configured RLM measurement window can be used for IS evaluation, but not for OOS evaluation.

In yet another example, if the UE is configured with CO from serving cell (e.g., from GC-PDCCH), RLM-RS(s) within the configured RLM measurement window and within the CO at the same time are used for IS/OOS evaluation.

In one example, a UE does not expect to be configured with RLM-RS outside the RLM measurement window or outside a configured CO.

In another example, there could be RLM-RS(a) outside the configured RLM measurement window or outside a configured CO, and the RLM-RS(a) outside the configured RLM measurement window or outside a configured CO can be used for IS evaluation, but not for OOS evaluation.

In yet another example, if the UE determines more than one time-domain locations for RLM-RS resources, as detailed in this disclosure, the UE can choose one of the RLM-RS resources for IS/OOS evaluation.

In one example, the UE can choose any of the RLM-RS resources by the UE's implementation.

In another example, the UE can choose the RLM-RS resource that the UE detects first in the time-domain and stops performing RLM measurement within the same RLM measurement window.

In yet another example, if the UE determines more than one time-domain locations for RLM-RS resources, as detailed in this disclosure, the UE can choose more than one (e.g., including all) of them for IS/OOS evaluation.

In one example, the UE can determine as IS, if any of the more than one time-domain locations for RLM-RS resources is evaluated as IS.

In another example, the UE can determine as OOS, if all of the more than one time-domain locations for RLM-RS resources are evaluated as OOS.

Figure 11:
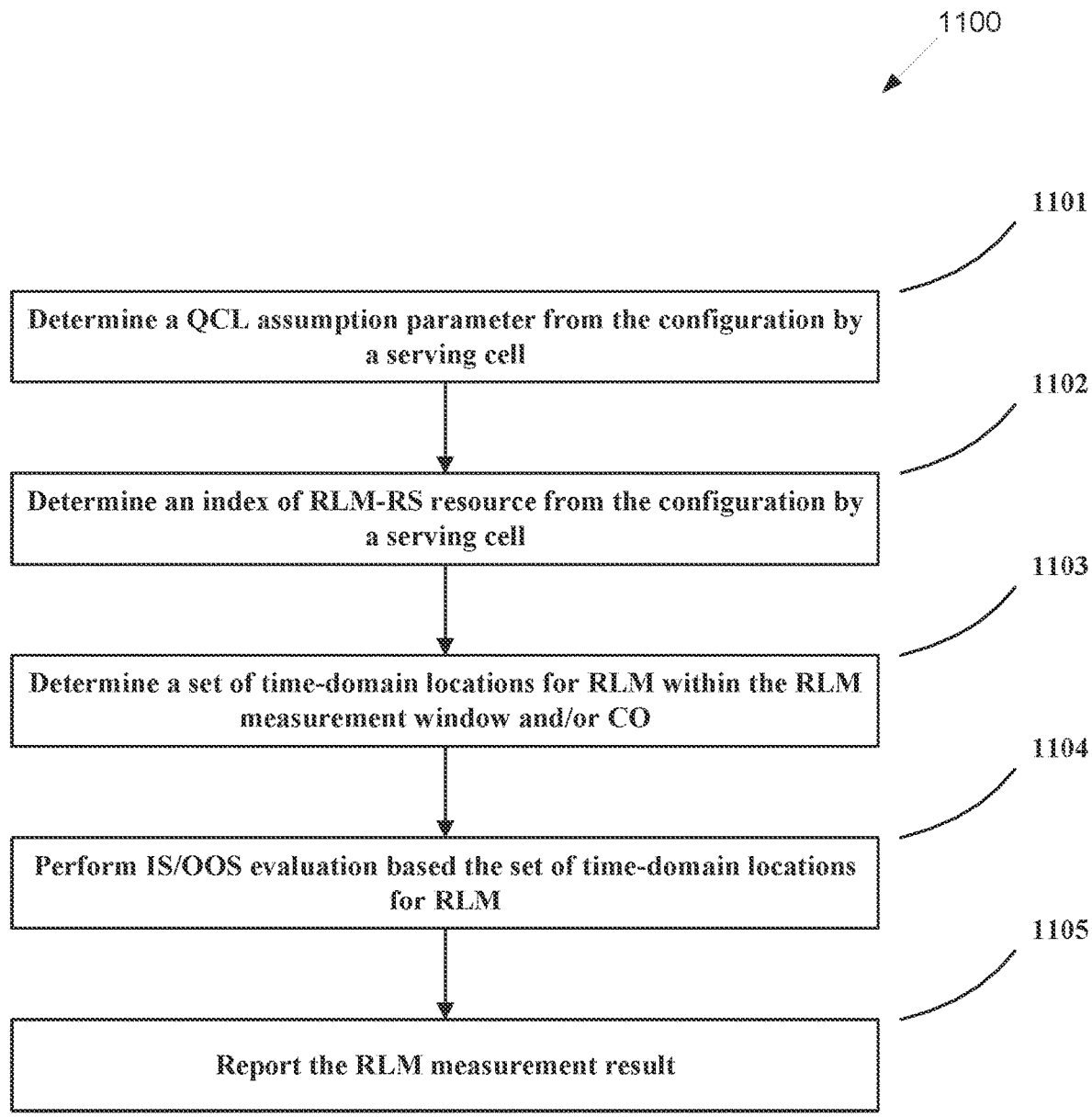
FIG. 11 illustrates a flowchart of a UE procedures for RLM measurement for operation with shared spectrum channel access according to embodiments of the present disclosure.

FIG. 11 illustrates a flowchart of a UE procedures 1100 for RLM measurement for operation with shared spectrum channel access according to embodiments of the present disclosure. An embodiment of the UE procedures 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

As illustrated in FIG. 11, a UE first determines a QCL assumption parameter from a configuration by a serving cell at step 1101, and determines an index of RLM-RS resource from a configuration by the serving cell at step 1102, wherein the RLM-RS can be at least one of an SS/PBCH block or a CSI-RS resource for example. The UE then determines a set of time-domain locations for RLM at step 1103, corresponding to the configured index of RLM-RS resource, within the RLM measurement window and/or the channel occupancy if known to the UE. The UE performs IS/OOS evaluation based on the set of time-domain locations for RLM at step 1104, according to the descriptions in this disclosure, and reports the evaluation result at step 1106.

Figure 12:
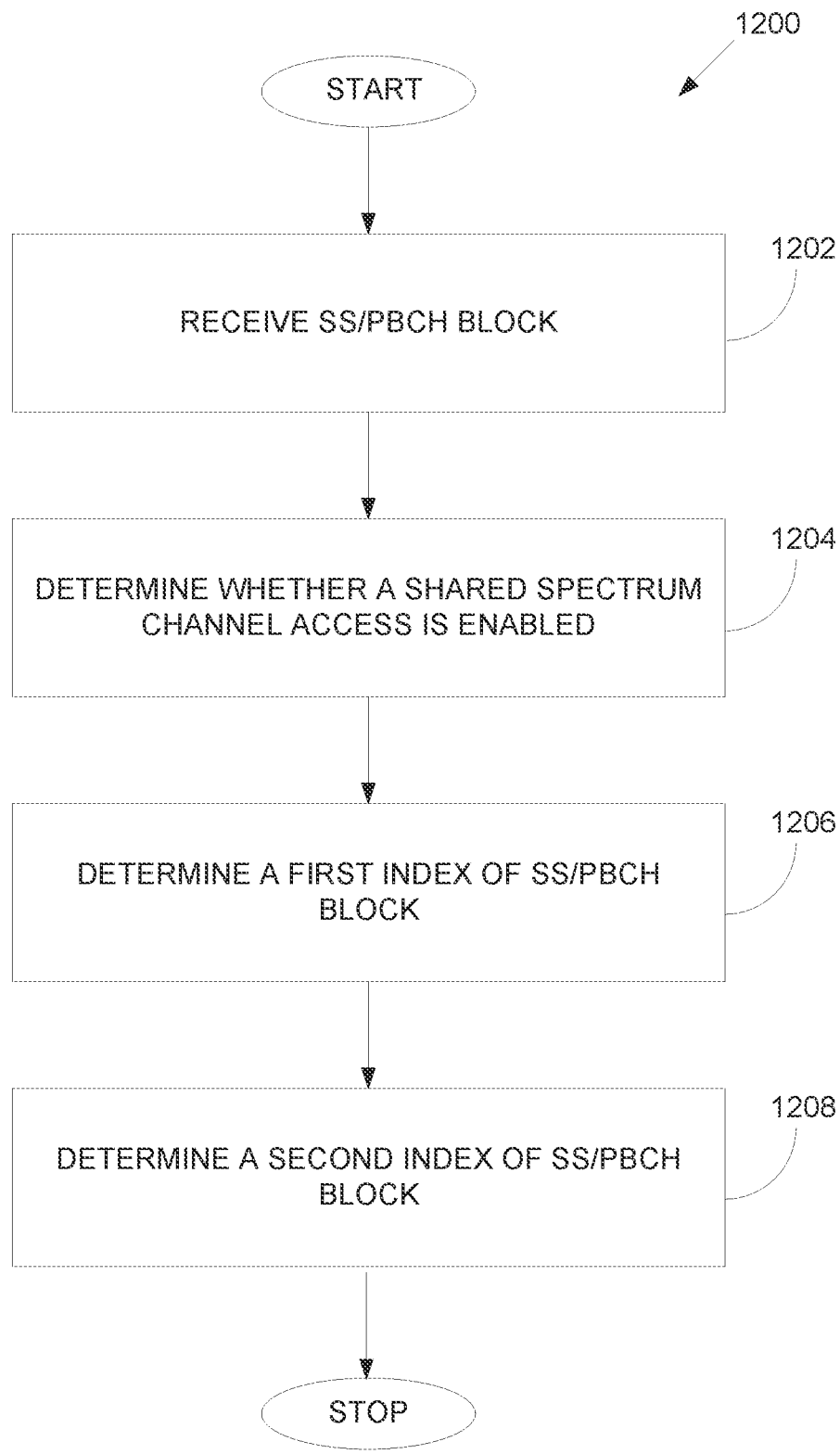
FIG. 12 illustrates a flowchart of a method for indexing of SS/PBCH block on unlicensed spectrum according to embodiments of the present disclosure.

FIG. 12 illustrates a flowchart of a method 1200 for indexing of SS/PBCH block on unlicensed spectrum according to embodiments of the present disclosure, as may be performed by a UE (e.g., 111-116 as illustrated in FIG. 1). An embodiment of the method 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

As illustrated in FIG. 12, the method 1200 begins at step 1202. In step 1202, the UE receives a synchronization signals and physical broadcast channel (SS/PBCH) block.

Subsequently, in step 1204, the UE determines whether a shared spectrum channel access is enabled. Next, in step 1206, the UE determines a first index of the SS/PBCH block as a candidate SS/PBCH block index ($I_{SSB1}$) based on a number of candidate SS/PBCH blocks in a half frame. Finally, in step 1208, the UE determines a second index of the SS/PBCH block as an SS/PBCH block index ($I_{SSB2}$) based on a QCL parameter (Q) indicated by a PBCH in the SS/PBCH block, wherein the SS/PBCH block index ($I_{SSB2}$) is determined as: $I_{SSB2}=I_{SSB1}$ mod Q based on a determination that the shared spectrum channel access is enabled, where mod is a modular operation; or $I_{SSB2}=I_{SSB1}$ based on the determination that the shared spectrum channel access is not enabled.

In one embodiment, $I_{SSB1}$ is determined as $0 \leq I_{SSB1} \leq \overline{L}_{max}-1$, where $\overline{L}_{max}$ is the number of candidate SS/PBCH blocks in the half frame, and $I_{SSB2}$ is determined as $0 \leq I_{SSB2} \leq Q-1$, where Q is the QCL parameter indicated by the PBCH included in the SS/PBCH block.

In one embodiment, the UE receives, based on the first index determined as the candidate SS/PBCH block index ($I_{SSB1}$), a de-modulation reference signal (DMRS) of the PBCH in the SS/PBCH block and a scrambling sequence of the PBCH where: if $\overline{L}_{max}=4$, two LSBs of the candidate SS/PBCH block index ($I_{SSB1}$) are used, and if $\overline{L}_{max} \geq 8$, three LSBs of the candidate SS/PBCH block index ($I_{SSB1}$) are used.

In one embodiment, the UE receives, based on the first index determined as the candidate SS/PBCH block index ($I_{SSB1}$), a payload of the PBCH in the SS/PBCH block and a number A of scrambled bits in the payload of the PBCH, where: if $\overline{L}_{max}=10$, $\overline{a}_{\overline{A}+6}$ is reserved, and $\overline{a}_{\overline{A}+7}$ is a most significant bit (MSB) of the candidate SS/PBCH block index ($I_{SSB1}$), A=M−4; and if $\overline{L}_{max}=20$, $\overline{a}_{\overline{A}+6}$ and $\overline{a}_{\overline{A}+7}$ are two MSBs of the candidate SS/PBCH block index ($I_{SSB1}$), A=M−5, where M is a number of bits in the payload of the PBCH.

In one embodiment, the UE performs, based on the determination that the shared spectrum channel access is enabled, a radio link monitoring based on at least one SS/PBCH block in a discovery burst transmission window and the candidate SS/PBCH block index ($I_{SSB1}$) corresponding to the SS/PBCH block index ($I_{SSB2}$) indicated by a higher layer parameter (ssb-Index).

In one embodiment, the UE performs, based on a determination that the shared spectrum channel access is enabled, an uplink power control based on at least one SS/PBCH block with the candidate SS/PBCH block index ($I_{SSB1}$) corresponding to the SS/PBCH block index ($I_{SSB2}$) indicated by a higher layer parameter (ssb-Index).

In one embodiment, the UE performs, based on a determination that the shared spectrum channel access is enabled, an operation of PDCCH candidate validation based on at least one SS/PBCH block with the candidate SS/PBCH block index ($I_{SSB1}$) corresponding to the SS/PBCH block index ($I_{SSB2}$) indicated by a higher layer parameter (ssb-PositionsInBurst).

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a communication system, the UE comprising:
   a transceiver configured to receive, from a base station, a synchronization signal and physical broadcast channel (SS/PBCH) block; and
   a processor operably coupled to the transceiver, the processor configured to:
      determine a candidate SS/PBCH block index ($I_{SSB1}$) based on a number of candidate SS/PBCH blocks in a half frame, and
      determine a SS/PBCH block index ($I_{SSB2}$) based on the candidate SS/PBCH block index ($I_{SSB1}$) and a parameter (Q) associated with a quasi-co-location (QCL),
   wherein, for operation with a shared spectrum channel, the SS/PBCH block index ($i_{SSB2}$) is determined as $I_{SSB2}=I_{SSB1}$ mod Q, where mod is a modular operation.

2. The UE of claim 1, wherein, for operation without shared spectrum channel, the SS/PBCH block index ($I_{SSB2}$) is same as the candidate SS/PBCH block index ($I_{SSB1}$).

3. The UE of claim 1, wherein, for operation with a shared spectrum channel, the SS/PBCH block index ($I_{SSB2}$) is based on an index ($I_{DMRS}$) of a demodulation reference signal (DM-RS) sequence transmitted in a PBCH of the SS/PBCH and the QCL parameter (Q), as $I_{SSB2}=I_{DMRS}$ mod Q.

4. The UE of claim 1, wherein the parameter (Q) associated with the QCL is obtained from a master information block (MIB) in the SS/PBCH block.

5. The UE of claim 1, wherein a demodulation reference signal (DMRS) sequence of a PBCH in the SS/PBCH block and a scrambling sequence of the PBCH in the SS/PBCH block is associated with:
   three least significant bits (LSBs) of the candidate SS/PBCH block index ($I_{SSB1}$) for $L_{max} \geq 8$, and
   two LSBs of the candidate SS/PBCH block index ($I_{SSB1}$) for $L_{max}=4$.

6. The UE of claim 1, wherein a payload of a PBCH in the SS/PBCH block is associated with:
   a most significant bit (MSB) of the candidate SS/PBCH block index ($I_{SSB1}$) for $L_{max}=10$,
   two MSBs of the candidate SS/PBCH block index ($I_{SSB1}$) for $L_{max}=20$, and
   three MSBs of the candidate SS/PBCH block index ($I_{SSB1}$) for $L_{max}=64$.

7. The UE of claim 1, wherein a PBCH payload is scrambled using a parameter (M) determined based on a PBCH payload size (A) and a maximum number of the candidate SS/PBCH blocks in the half frame, the parameter (M) being determined as:
   M=A−3 for $L_{max} \leq 8$,
   M=A−4 for $L_{max}=10$,
   M=A−5 for $L_{max}=20$, and
   M=A−6 for $L_{max}=64$.

8. The UE of claim 1, wherein the processor is further configured to perform uplink power control based on at least one SS/PBCH block having the candidate SS/PBCH block index ($I_{SSB1}$) corresponding to the SS/PBCH block index ($I_{SSB2}$).

9. The UE of claim 1, wherein, in case that at least one resource element (RE) for a physical downlink control channel (PDCCH) candidate overlaps with at least one RE of a candidate SS/PBCH block corresponding to the SS/PBCH block index ($I_{SSB2}$) indicated by the information, the PDCCH candidate is not monitored by the UE.

10. The UE of claim 1, wherein a set of symbols of a slot, corresponding to the SS/PBCH block having a candidate SS/PBCH block index ($I_{SSB1}$) corresponding to the SS/PBCH block index ($I_{SSB2}$) indicated by the information, is not indicated as uplink by slot format indicator (SFI) index field of downlink control information (DCI).

11. The UE of claim 1, wherein:
   for operation with shared spectrum channel, the transceiver is further configured to receive, from the base station, a SS/PBCH block index for radio link monitoring (RLM), and
   RLM is performed based on a SS/PBCH block having a candidate SS/PBCH block index corresponding to the SS/PBCH block index for RLM.

12. A base station in a communication system, the base station comprising:
   a processor; and
   a transceiver operably coupled to the processor the transceiver configured to transmit, to a user equipment (UE), a synchronization signal and physical broadcast channel (SS/PBCH) block,
   wherein a candidate SS/PBCH block index ($I_{SSB1}$) is based on a number of candidate SS/PBCH blocks in a half frame,
   wherein a SS/PBCH block index ($I_{SSB2}$) is based on the candidate SS/PBCH block index ($I_{SSB1}$) and a parameter (Q) associated with a quasi-co-location (QCL), and
   wherein, for operation with a shared spectrum channel, the SS/PBCH block index ($I_{SSB2}$) is $I_{SSB2}=I_{SSB1}$ mod Q, where mod is a modular operation.

13. The base station of claim 12, wherein, for operation without shared spectrum channel, the SS/PBCH block index ($I_{SSB2}$) is same as the candidate SS/PBCH block index ($I_{SSB1}$).

14. The base station of claim 12, wherein, for operation with a shared spectrum channel, the SS/PBCH block index ($I_{SSB2}$) is based on an index ($I_{DMRS}$) of a demodulation reference signal (DM-RS) sequence transmitted in a PBCH of the SS/PBCH and the QCL parameter (Q), as $I_{SSB2}=I_{DMRS}$ mod Q.

15. The base station of claim 12, wherein the parameter (Q) associated with the QCL is provided by a master information block (MIB) in the SS/PBCH block.

16. The base station of claim 12, wherein a demodulation reference signal (DMRS) sequence of a PBCH in the SS/PBCH block and a scrambling sequence of the PBCH in the SS/PBCH block are associated with:
   three least significant bits (LSBs) of the candidate SS/PBCH block index ($I_{SSB1}$) for $L_{max} \geq 8$, and
   two LSBs of the candidate SS/PBCH block index ($I_{SSB1}$) for $L_{max}=4$.

17. The base station of claim 12, wherein a payload of a PBCH in the SS/PBCH block is associated with:
   a most significant bit (MSB) of the candidate SS/PBCH block index ($I_{SSB1}$) for $L_{max}=10$,
   two MSBs of the candidate SS/PBCH block index ($I_{SSB1}$) for $L_{max}=20$, and
   three MSBs of the candidate SS/PBCH block index ($I_{SSB1}$) for $L_{max}=64$.

18. The base station of claim 12, wherein a PBCH payload is scrambled using a parameter (M) determined based on a PBCH payload size (A) and a maximum number of the candidate SS/PBCH blocks in the half frame, the parameter (M) being determined as:
   $M=A-3$ for $L_{max} \leq 8$,
   $M=A-4$ for $L_{max}=10$,
   $M=A-5$ for $L_{max}=20$, and
   $M=A-6$ for $L_{max}=64$.

19. A method performed by a user equipment (UE) in a communication system, the method comprising:
   receiving, from a base station, a synchronization signal and physical broadcast channel (SS/PBCH) block,
   determining a candidate SS/PBCH block index ($I_{SSB1}$) based on a number of candidate SS/PBCH blocks in a half frame; and
   determining a SS/PBCH block index ($I_{SSB2}$) based on the candidate SS/PBCH block index ($I_{SSB1}$) and a parameter (Q) associated with a quasi-co-location (QCL),
   wherein, for operation with a shared spectrum channel, the SS/PBCH block index ($I_{SSB2}$) is determined as $I_{SSB2}=I_{SSB1}$ mod Q, where mod is a modular operation.

20. A method performed by a base station in a communication system, the method comprising:
   transmitting, to a user equipment (UE), a synchronization signal and physical broadcast channel (SS/PBCH) block,
   wherein a candidate SS/PBCH block index ($I_{SSB1}$) is based on a number of candidate SS/PBCH blocks in a half frame,
   wherein a SS/PBCH block index ($I_{SSB2}$) is based on the candidate SS/PBCH block index ($I_{SSB1}$) and a parameter (Q) associated with a quasi-co-location (QCL), and
   wherein, for operation with a shared spectrum channel, the SS/PBCH block index ($I_{SSB2}$) is $I_{SSB2}=I_{SSB1}$ mod Q, where mod is a modular operation.

* * * * *